United States Patent

[11] 3,615,702

[72] Inventor   Horton E. Swisher
                Upland, Calif.
[21] Appl. No.  784,873
[22] Filed      Dec. 18, 1968
[45] Patented   Oct. 26, 1971
[73] Assignee   Sunkist Growers, Inc.
                Los Angeles, Calif.

[54] LIQUID SALAD DRESSING BASE
     6 Claims, No Drawings
[52] U.S. Cl. .................................................. 99/144
[51] Int. Cl. .............................................. A23l 1/24
[50] Field of Search ........................................ 99/144, 140

[56]            References Cited
         UNITED STATES PATENTS
2,170,518   8/1939   Musher ....................... 99/144
3,041,180   6/1962   Swisher ...................... 99/140

Primary Examiner—Raymond N. Jones
Assistant Examiner—J. M. Hunter
Attorney—Paul A. Weilein ABSTRACT: Liquid salad dressing base of an edible oil carrying oil-insoluble particles of essential oil in emulsion form in a water-soluble matrix, whereby upon addition of an aqueous phase and shaking the water-soluble matrix dissolves forming a finished salad dressing containing all the necessary oil, flavor and aqueous materials.

LIQUID SALAD DRESSING BASE

Thus, a stabilized anhydrous essential-oil extract from the original spice or other vegetable material, such as garlic or cloves or nutmeg or peppermint or black pepper or turmeric, and so on through the long list of spices and other flavors, which had previously been prepared in a dry stable form, is now prepared without water in edible vegetable salad oil, along with other nonaqueous salad dressing constituents that might be desired, and hermetically sealed as in glass bottles, as a salad dressing base ready to be combined subsequently with the necessary water or juices or other aqueous constituents wanted at the time the completed dressing is to be used on the table.

The stable essential-oil flavoring material, in the presence of other desired nonaqueous constituents, is protected by the vegetable salad oil against moisture pickup from its environment (air, etc.) and the resultant deterioration brought about by hydrolytic or oxidative changes. By sealing such salad-dressing base in glass bottles or the like, the product has a long shelf life of months or as long as a year or more. This protective oil may be any of the known normally liquid edible salad oils such as corn oil, cottonseed oil, soya oil, olive oil, and safflower oil. The stabilized essential oil flavoring may be and preferably is a normally solid essential-oil emulsion in particulate form producible under my earlier U.S. Pat. No. 3,041,180 of June 26, 1962, which products also have great oxidative resistance and therefore long shelf life. Such a solid-emulsion of an essential oil is a mixture of corn syrup solids with glycerol or a nontoxic liquid glycol or a mixture of glycerol and glycol, the surfaces of the solid-emulsion particles preferably being free from residual essential oil as such whereby to control oxidative deterioration.

When to be prepared for table use, the water and/or other aqueous constituents wanted, such as vinegar and lemon juice, are added in amounts desirably approaching about one-half the vegetable oil and shaken well, thereby yielding a fresh-tasting liquid salad dressing without the necessity of initially accumulating and combining all the constituents by the housewife. Thus, serious flavor deterioration often found in liquid-type salad dressings available on the market is avoided.

INVENTION DISCLOSURE

The essential-oil flavors or spice extracts, whether or not they also contain resins (as in the case of oleoresins), are initially recovered by any of the known recovery process including expression, extraction, and distillation, and are commercially obtainable upon the market. There are a great many of them and they are limited for the present purpose only by the housewife's, salad maker's, and gourmet's tastes. They include black pepper, white pepper, cayenne pepper, onion, garlic, celery, oregano, parsley, basil, rosemary, marjoram, paprika, mustard, sage, dill, savory, tarragon, bay, allspice, cardamom, cinnamon, clove, coriander, ginger, nutmeg, thyme, turmeric, mace, wintergreen, peppermint, and the citrus oils, especially lemon and grapefruit oils. Any of these, to suit the taste, may be used to impart to liquid salad dressings the "garden fresh" or "fresh-tasting" flavor sought, after having been initially prepared in the "stable" flavor form here indicated.

The required stable-flavor composition or solid essential-oil flavoring composition is that type disclosed in my above-mentioned U.S. Pat. No. 3,041,180 of June 26, 1962, and comprising, as therein claimed, a solid particulate emulsion of essential oil in a mixture of corn syrup solids and between about 2 percent and about 15 percent by weight of the total weight of glycerol or a nontoxic glycol or a mixture thereof (which appear to plasticize the solid emulsion) with a minor amount of an emulsifier, the particle surfaces being preferably substantially free from the essential oil. This absence of surface oil insures against oil degradation and also insures long shelf life or storage life even in excess of a year. In brief, such a solid essential-oil product is made by admixing corn syrup solids with the glycerol or nontoxic glycol or mixture of the glycol and glycerol, heating the mixture sufficiently high to form a syrup, adding the essential oil and an emulsifying agent, emulsifying the resulting composition by agitation to form a solid emulsion, and subdividing the solid emulsion into particles.

The essential oils or spice involved are essentially water-insoluble. They are emulsified with the molten mixture of glycerol and corn syrup solids, the two latter being in proportions as above indicated, at temperatures around 110° C. to 130° C. The proportion of essential oil is, in general, not critical and may run around 5 percent to 10 percent, or even more or less such as 2 percent or 3 percent to 25 percent or more, depending upon the essential oil or operating conditions or personal preference, as understood by those skilled in the art. Examples herein given will be a further guide.

For convenience here, some further details are supplied as representing suitable procedures. A glycerol-corn syrup solids mixture having about 4 percent to 9 percent glycerol is heated in a range of 110° C. to 130° C. to a heavy syrup of uniform composition, the corn syrup solids having commonly had a moisture content of about 3.5 percent, and the glycerol being 95 percent U.S.P. to permit solubility and melting of the corn syrup solids. The mixture is then cooled to a range of about 100° C. to 110° C. for introduction of the essential oil under the surface for minimal degradation of the oil. A minor amount of an emulsifying or dispersing agent is added to the cooled mixture prior to or along with the addition of the essential oil, not more than about 2 percent of the emulsifier being generally required. There are many suitable emulsifiers such as monodiglyceride sodium sulfo-acetate, lecithin, sucrose esters of fatty acids and gum arabic, as well known to the chemist. The essential oil preferably should be dry before incorporation, and it may initially contain around 0.05 percent to 0.5 percent of an antioxidant such as butylated hydroxyanisole or butylated hydroxytoluene.

The resulting mixture is then emulsified by agitation (high hydraulic shear) in a jacketed kettle preferably under an inert gas atmosphere such as nitrogen. The emulsion is immediately extruded into filaments of about 1/64 inch diameter into a cool atmosphere and preferably into a cold organic solvent for the essential oil and a nonsolvent for the corn syrup solids such as high proof isopropanol; but others such as absolute ethyl alcohol, vegetable oil, and mineral oil also are suitable. The filaments become brittle nonplastic amorphous solids as soon as they enter the cold solvent. The filaments are broken into short lengths, such as three times their diameter, by an impact propeller. After a few minutes, the solvent will have removed surface oils from the particles and the solvent may be removed and the product packaged.

The following specific examples are furnished to illustrate.

EXAMPLE 1–PEPPERMINT OIL

About 250 grams of 95 percent glycerol was heated in a steam jacketed round bottom kettle while about 2,500 grams of fine granular corn syrup solids (3.5 percent moisture) was added slowly with constant stirring. With the jacket pressure at 30 lbs. per square inch the temperature of the glycerol-corn syrup solids "melt" was raised to 125° C. After cooling the melt to 120° C., 42 grams of monodiglyceride of sodium sulfoacetate was added while stirring with a motor driven impeller. Then 150 grams of natural peppermint oil was added under the surface of the melt at 115° C. with continued stirring until all of the essential oil was emulsified.

The emulsified oil composition was then poured into a steam jacketed leg arranged vertically with a bottom extrusion plate containing holes of approximately 1/64 inch diameter. By applying 32 lbs. per square inch air pressure above the surface of the plastic material, flavor cylinders were extruded into a vessel containing cool high-proof isopropanol. The hair-like flavor cylinders solidified immediately and were reduced to the desired length of approximately three times their diameter by impact breaking of the solid-flavor isopropanol-slurry with a motor driven impeller blade. The excess alcohol was drained off and the solid peppermint flavor material was dried under vacuum. An excellently flavored solid peppermint oil of 1.63 percent moisture was obtained.

EXAMPLE 2–OIL OF WINTERGREEN

Exactly the same procedure as that of example 1 was used employing oil of wintergreen. The product was used employing oil of wintergreen. The product contained 2.26 percent moisture.

EXAMPLE 3–LEMON OIL

The 480 grams of U.S.P. glycerol in a steam-jacketed kettle, 5,046 grams of corn syrup solids (3.5 percent moisture) was slowly added with stirring and heating to 128° C. The mixture was cooled to 110° C. and 69 grams of monodiglyceride of sodium sulfoacetate added. Then 390 grams of cold pressed lemon oil, containing 0.02 percent of butylated hydroxytoluene was slowly mixed in at 108° C. After extrusion into 99.6 percent isopropanol, the product was vacuum dried to yield a flavor product having 2.32 percent moisture.

EXAMPLE 4–GARLIC OIL

To 285 grams of 99 percent glycerol in a steam jacketed stainless steel kettle, 2,760 grams of fine granular corn syrup solids (3.5 percent moisture) was added with constant stirring. Under 30 pounds steam pressure the glycerol-corn syrup solids mixture was heated to 122° C. At this temperature, 60 grams of a monodiglyceride of sodium sulfoacetate were added, followed by 345 grams garlic oil.

Upon completion of emulsification, the semiplastic composition was transferred to a steam jacketed leg and extruded by means of air pressure through a plate with 1/64 inch holes into cold isopropanol. The brittle solid flavor cylinders were reduced in size by means of impact breaking of the isopropanol-solids slurry.

After draining off the isopropanol, the solid garlic oil flavoring material was dried under vacuum.

EXAMPLE 5–RED PEPPER (CAPSICUM) OR BLACK PEPPER

To 320 grams of 99 percent glycerol in a steam jacketed stainless steel kettle, 3,120 grams of fine granular corn syrup solids (3.5 percent moisture) were slowly added with constant stirring while the mix was being heated to 125° C. with 30 pounds steam pressure. At this temperature, 60 grams of a monodiglyceride of sodium sulfoacetate were added, followed by 500 grams Capsicum Oleoresin (African, 500,000 pungency).

Upon completion of emulsification, the semiplastic composition was transferred to a steam jacketed leg and extruded by means of air pressure through a plate with 1/64 inch holes into cold isopropanol. The brittle solid flavor cylinders were reduced in size by means of impact breaking of the isopropanol-solids slurry.

After draining off the isopropanol, the solid capsicum flavoring material was dried under vacuum. EXAMPLE 6–ROSEMARY 288 grams of 99 percent glycerol were heated in a steam jacketed kettle while 2,808 grams of fine granular corn syrup solids (3.5 percent moisture) were added slowly with constant stirring. With about 30 p.s.i. of steam on the jacket, the temperature of the mixture was raised to 128° C. at which time 54 grams of a monodiglyceride of sodium sulfoacetate were added, followed by 450 grams of rosemary oleoresin. Stirring was continued until the oleoresin was emulsified.

After transferring the semiplastic flavoring composition to a steam jacketed leg, it was extruded through a plate with 1/64 inch holes into cold isopropanol. A high speed impeller blade reduced the long cylinders to an alcohol-solids slurry of short rods.

The excess alcohol was drained off and the solid flavoring material dried under vacuum.

EXAMPLE 7–CELERY 320 grams of 99 percent glycerol were heated in a steam jacketed kettle while 3,128 grams of fine granular corn syrup solids (3.5 percent moisture) were added slowly with constant stirring. With about 30 p.s.i. of steam on the jacket, the temperature of the mixture was raised to 128° C. at which time 60 grams of a monodiglyceride of sodium sulfoacetate were added, followed by 492 grams of celery oleoresin (Indian). Stirring was continued until the oleoresin was emulsified.

After transferring the semiplastic flavoring composition to a steam jacketed leg, it was extruded through a plate with 1/64 inch holes into cold isopropanol. A high speed impeller blade reduced the long cylinders to an alcohol-solids slurry of short rods.

The excess alcohol was drained off and the solid flavoring material dried under vacuum.

All of these essential-oil solid emulsion flavors are substantially anhydrous for the present purpose, inasmuch as they always contain less than 6 percent moisture, generally less than about 4 percent, and usually have between only about 1 percent and 2.7 percent moisture. Thus, when combined within the protective edible vegetable oil, and with other substantially anhydrous constituents that may be desired such as crystalline sugar, common salt, anhydrous sodium acetate and anhydrous citric acid, a substantially anhydrous or moisture-free product protected against flavor loss is provided, especially in sealed receptacles like glass bottles, to be combined later at the time of use with water-containing constituents such as vinegar, water, wine, cider, lime juice, lemon juice, orange juice, and the like. If desired, even chopped fresh vegetable particles such as mint leaves may be added.

In producing the present anhydrous or water-free salad dressing base, the desired dry nonliquid constituents are combined with an appropriate amount of the chosen salad oil, for example soya oil or olive oil, or a mixture of such edible vegetable oils as are herein indicated. Typically, around 2 grams to around 5 or 6 grams of the described solid essential-oil emulsion flavor materials will be used with about 100 milliliters of the oil. In addition, such flavor enhancers as ordinary table salt and sugar in common crystalline forms will ordinarily be added in amounts such as 1 to 4 grams according to taste. If vinegar or other acid flavor is also desired in the water-free salad dressing base hereof, this may be accomplished by adding a few grams of crystalline citric acid and either sodium or potassium acetate if an acetic (vinegar character is desired, these being in the anhydrous form, for example 3 to 5 grams of either or both.

The particular flavor-stable product of the patent and the above examples, as such product is used in the salad oil base of this invention is, as developed above, a solid enclosing matrix or shell (continuous phase) which is water-soluble but oil insoluble, as represented by the corn-syrup solids and glycerine, and an enclosed material (discontinuous phase) which is the essential-oil flavoring constituent or element and which is oil-soluble but essentially water-insoluble. Thus, the outer or enclosing constituent or element, being insoluble in the salad oil, protects the inner flavoring essential oil constituent against solution in the vegetable oil of the present salad oil base.

Subsequently, when aqueous agents, such as fruit juices like lemon juice, or vinegar, or water, are added in producing the ultimate salad dressings for the table, the water-soluble encapsulating shells are dissolved by the aqueous agents, thereby liberating the essential-oil and spice flavors for solution in the salad oil or for general dispersibility in the completed salad dressing mixture.

Thus, the vegetable oil of the salad dressing base of this improvement performs the important function of protecting essential-oil flavors because it does not dissolve the water-soluble encapsulating shells, thereby avoiding release of the essential-oil flavors until water subsequently is added in some form. The required protection of the salad oil is maintained by sealing in glass bottles or other hermetically sealed containers. The salad oil, in turn, provides an ideal environment for the preservation without deterioration of the solid flavoring component.

The housewife may then produce a typical oil-dressing by adding to such base, for example, about half as much aqueous material based on the oil to yield the desired partially-emulsified liquid dressing by hand shaking, as in a separate household shaker flask, or in the original bottle if space has been provided. The aqueous addition may be water or it may be a red wine vinegar or tarragon-flavored vinegar or other vinegar, or lemon or other juice, or wine or such other liquid as she may prefer. Thus, since the essential-oil flavor has been perfectly preserved during storage of the sealed salad-dressing base, she may now add such other constituents as desired and be assured of having a flavor-fresh product for her guests and modified as she may wish to produce a gourmet dressing.

The following table represents nonaqueous or anhydrous liquid salad dressing bases in their original packaged forms:

TYPICAL NON-AQUEOUS SALAD DRESSING BASES

|  | (1) | (2) | (3) | (4) | (5) |
|---|---|---|---|---|---|
| Edible salad oil (olive, soya, cottonseed, safflower, etc.), ml | 100 | 100 | 100 | 100 | 100 |
| Sodium acetate anhydrous (optional), grams | 3.5 | 3.5 | 5.0 |  |  |
| Citric acid anhydrous (optional), grams | 3.5 | 3.5 |  |  |  |
| Table salt anhydrous (optional), grams | 2.0 | 2.0 | 2.0 | 2.0 | 1.0 |
| Sugar anhydrous (optional), grams | 1.0 | 1.0 | 2.0 | 1.0 | 2.0 |
| Stable solid-emulsion anhydrous essential-oil flavor: |  |  |  |  |  |
| Garlic, grams | 2.0 |  |  | 1.0 | 1.0 |
| Black pepper, grams | 1.5 |  | 1.0 |  |  |
| Celery, grams | 1.0 | 4.0 | 2.0 |  |  |
| Onion, grams | 0.4 | 0.3 | 0.5 | 1.0 |  |
| Red pepper, grams |  |  | 0.1 |  |  |
| Parsley, grams |  |  |  |  | 1.0 |
| Paprika, grams |  |  |  | 2.0 |  |
| Rosemary, grams |  | 1.0 |  |  |  |
| Oregano, grams |  |  |  | 0.4 |  |
| Basil, grams |  |  |  | .02 |  |

The following represent aqueous additions for complete dressings:

TYPICAL AQUEOUS ADDITIONS FOR TABLE USE

|  | (1) | (2) | (3) | (4) | (5) |
|---|---|---|---|---|---|
| Water, ml | 50 | 50 |  |  |  |
| Vinegar, ml |  |  |  | 50 |  |
| Lemon juice (single strength), ml |  |  | 50 |  | 50 |

Vinegar and lemon juice both may be added in 25 ml. quantities instead of alone in 50 ml. quantities indicated. Other previously noted aqueous additives may be substituted in such proportions as desired to yield appropriate totals. Also, other flavors may be used such as lemon, peppermint, and ginger.

When the crystalline anhydrous flavoring adjuncts are not present, the other adjuncts run from 1 to 2 percent or more by weight, and when the adjuncts are included the total anhydrous adjuncts may be from about 15 percent to about 20 percent. Also, the anhydrous solid-emulsion essential-oil flavors may amount to 4 or 5 percent and may exceed that proportion when desired.

As is apparent from the foregoing, I have provided a nonaqueous liquid oil-containing salad dressing base containing solid-emulsion essential-oil flavors that are protected by the oil until ready for dilution with aqueous substances, such as vinegar, citrus fruit, or other juices, water, wines, and the like, whereby to provide for immediate table use a completed fresh flavor liquid salad dressing to meet the housewife's current wishes.

As also apparent, a great many variations in both the nonaqueous liquid dressing base and in finally prepared salad dressings for the table may be made within the scope of the present invention, all these possessing fresh-tasting spice and other essential-oil flavors.

I claim:

1. A salad dressing base substantially free from moisture for making flavored shake and serve oil phase-aqueous phase liquid salad dressing and including:
    a quantity of an edible normally liquid vegetable salad oil constituting the body of the base;
    particles consisting essentially of an edible water-soluble, oil-insoluble solid matrix enclosing edible essential oil flavor constituents therein in emulsion form, said particles being carried by said oil and said essential oil flavor constituents being protected from contact with said oil by said oil-insoluble matrix but releasable therefrom in unimpaired state upon addition of an aqueous phase and shaking;
    whereby upon adding said aqueous phase, said salad oil comprises substantially all of the oil phase of said salad dressing.

2. A salad dressing base as in claim 1 wherein the particles are substantially free from the flavor constituents on their surfaces.

3. A salad dressing base as in claim 1 including moisture-free flavoring adjuncts in said oil but external to said particles.

4. A salad dressing base as in claim 3 wherein the total nonaqueous flavorings amount to between about 2 percent and about 20 percent by weight of the total base.

5. A salad dressing base as in claim 3 in which said moisture-free flavoring adjuncts are chosen from the class consisting of crystalline sugar, salt, anhydrous sodium acetate, anhydrous citric acid, and mixtures thereof.

6. A salad dressing base as in claim 1 wherein said solid matrix comprises corn syrup solids and a plasticizer selected from the group consisting of nontoxic glycols and glycerol in which the essential-oil is emulsified.

* * * * *